(12) United States Patent
Kudo et al.

(10) Patent No.: US 7,650,604 B2
(45) Date of Patent: Jan. 19, 2010

(54) ACCESS MANAGEMENT APPARATUS, ACCESS MANAGEMENT METHOD AND PROGRAM

(75) Inventors: Michiharu Kudo, Kanagawa-ken (JP); Naizhen Qi, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 11/450,727

(22) Filed: Jun. 9, 2006

(65) Prior Publication Data

US 2006/0294054 A1 Dec. 28, 2006

(30) Foreign Application Priority Data

Jun. 9, 2005 (JP) .............................. 2005-169965

(51) Int. Cl.
*G06F 9/46* (2006.01)
*G06F 7/00* (2006.01)

(52) U.S. Cl. ................................ 718/104; 707/2; 707/9

(58) Field of Classification Search ..................... 707/1, 707/2, 9; 718/104; 709/203; 719/123
See application file for complete search history.

(56) References Cited

U.S. PATENT DOCUMENTS 6,523,036 B1 * 2/2003 Hickman et al. .............. 707/10
7,065,745 B2 * 6/2006 Chan ........................... 717/117
7,130,882 B1 * 10/2006 Hudis et al. .................. 709/203
7,383,288 B2 * 6/2008 Miloushev et al. ........... 707/200

FOREIGN PATENT DOCUMENTS

| JP | 08-095844 | 4/1996 |
| JP | 2000-112891 | 4/2000 |
| JP | 2000-207363 | 7/2000 |
| JP | 2001-644106 | 12/2001 |
| JP | 2004-013832 | 1/2004 |

OTHER PUBLICATIONS

"Compressed Accessibility Mao: Efficient Access Control for XML", Yu, et al, Proceeding so fthe 28th VLDB Conference, 2002.

* cited by examiner

*Primary Examiner*—Meng-Ai An
*Assistant Examiner*—Camquy Truong
(74) *Attorney, Agent, or Firm*—Ken Corsello; Shimokaji & Associates, P.C.

(57) ABSTRACT

An access management apparatus, method and program storage device for permitting or prohibiting access to each of a plurality of nodes stored hierarchically, including means and steps for storing rule functions with a plurality of requesters to access a node, each of the rule functions for determining whether access should be permitted or rejected depending on the position of the node in the hierarchical structure or depending on the requester, receiving an access request from a requester, selecting the rule function, and executing the rule function which has been selected by the selector, and controlling permission of, or prohibition of, the access request on the basis of a result of executing the rule function.

2 Claims, 13 Drawing Sheets

(a)
```
<Organization>
    <department code="A00">
        <Employee role="Researcher">
            <Name>Alice</Name>
            <Salary>1000</Salary>
            ...
        </Employee>
    </Department>
    ...
</Organization>
```

410

<Taro, /a, +r> — 400a
<Taro, /a/b, +R> — 400b
<Taro, /a/b/c, -R> — 400c <Hana, /a, +r> — 400d
<Hana, /a/b, +r> — 400e
<Hana, /a/b/d, +r> — 400f <Tom, /a, +r> — 400g
<Tom, /a/b, +r> — 400h
<Tom, /a/b/c, +r> — 400i <Alice, /a, +r> — 400j
<Alice, /a/b, +r> — 400k
<Alice, /a/b/d, +r> — 400l

| REQUESTER | PACKAGE NAME | CLASS NAME | METHOD NAME | CACHE |
|---|---|---|---|---|
| Taro | pkg1 | Cls1 | method1 | /a=+r |
| Hana | pkg1 | Cls1 | method2 | /a=+r, /a/b=+r |
| Tom | — | — | — | — |
| Alice | pkg1 | Cls2 | method2 | — |

FIG. 5

| PACKAGE NAME | CLASS NAME | INSTANCE IDENTITY |
|---|---|---|
| pkg1 | Cls1 | Ins1 |
| pkg1 | Cls2 | — |

```
1   static public boolean method1 (String accessedPath) {
2       if(accessedPath. startsWith('/a/b/c'))    //INDICATE <Taro, /a/b/c,-R>
3           return false;
4       if(accessedPath. startsWith('/a/b'))      //INDICATE <Taro, /a/b,+R>
5           return true;
6       else if(accessedPath. equals('/a'))       //INDICATE <Taro, /a,+r>
7           return true;
6       return false;
7   }
```

| PATH | METHOD NAME |
|---|---|
| /a | method1 |
| /a/b | method2 |
| /a/b/c | method3 |
| /a/b/d | method4 |

FIG. 10

```
1  static public int method1 (String sbj) {
2      if(sbj. equals('Taro'))
3          return 2;
4      else if(sbj.equals('Hana'))
5          return 2;
6      else if(sbj.equals('Tom'))
7          return 2;
8      else if(sbj.equals('Alice'))
9          return 2;
10     else
11         return 1;
12 }
```

| REQUESTER | PATH | PACKAGE NAME | CLASS NAME | METHOD NAME |
|---|---|---|---|---|
| Taro | /a | pkg1 | cls1 | method1 |
| Taro | /a/b | pkg1 | cls1 | method2 |
| Taro | /a/b/c | pkg1 | cls1 | method3 |
| Hana | /a | pkg1 | cls1 | method1 |
| Hana | /a/b | pkg1 | cls1 | method2 |
| Hana | /a/b/d | pkg1 | cls1 | method4 |
| Tom | /a | pkg1 | cls2 | method1 |
| Tom | /a/b | pkg1 | cls2 | method2 |
| Tom | /a/b/c | pkg1 | cls2 | method3 |
| Alice | /a | pkg1 | cls2 | method1 |
| Alice | /a/b | pkg1 | cls2 | method2 |
| Alice | /a/b/d | pkg1 | cls2 | method4 |

```
1   static public int method3 (String sbj) {
2       if(esj. equals('Taro')) {
3           Object[] para = {'@d'};                      //CREATE VARIABLE ARRAY
4           String[] values = dataRetrieve(para) ;       //RETRIEVAL DATA BY
                                                            USE OF READ FUNCTION
5           if(Integer. parseInt(values[0])==1))         //CONDITIONAL EXPRESSION
                                                            INDICATING PREDICATE
                                                            EXPRESSION 6               return 2;
7       }
8       return 1;
9   }
```

(b)

```
1   static public int method3 (String sbj) {
2       if(sbj.equals('Taro')) {
3           Object[] para = {'./@e','@d'};  //TWO VARIABLES
4           String[] values = dataRetrieve(para) ;
5           //COMBINE TWO PREDITIONAL EXPRESSION TOGETHER
                INTO CONDITIONAL EXPRESSION
6           if(values[0]. equals('level1') && Integer.parseInt(values[1]==1))
7               return 2;
8       }
9       return 1;
10  }
```

```
1  static Pattern pattern = Pattern.compile("/a/d|/a/d.*|/a/.*/d|/a/.*/d/.*");
2  public static boolean methodDesc(String sbj, String accessedPath) {
3      if(sbj.equals("Taro")) {
4              Matcher matcher = patern.matcher (accessedPath) ;
5              if(matcher.matches())
6                  return false;
7      }
8  }
9      return true;
10 }
```

(b)

```
1  static Pattern pattern = Pattern.compile("/a/d|/a/d.*|/a/.*/d|/a/.*/d/.*");
2  public static int methodDesc(String accessedPath) {
3      Matcher matcher = patern.matcher (accessedPath) ;
4      if(matcher.matches())  return false;
5      return true;
6  }
```

FIG. 16

ACCESS MANAGEMENT APPARATUS, ACCESS MANAGEMENT METHOD AND PROGRAM

FIELD OF THE INVENTION

The present invention relates to an access management apparatus, an access management method and a program. Specifically, the present invention relates to an access management apparatus which determines whether access should be permitted or rejected on the basis of a policy including multiple rules, and to an access management method and a program concerning the access management apparatus.

BACKGROUND OF THE INVENTION

These years, attention has been brought to languages, such as XML, with which information is described by means of structuring the information into a hierarchical structure. XML is widely used in various fields. For example, typical use of XML is seen in the field of medical records, contracts and the like. In the case of such documents, it is desired that access permission or access rejection be capable of being set up for not only the whole of each of the documents but also each of a plurality of sets of information included in each of the documents. For example, permission of access by many people to information on a date and time of medical treatment does not bring about a problem. However, permission of access by many people to access information on the name of a disease is not desirable.

With this taken into consideration, it is desirable to provide an access control policy for specifying access permission or access rejection for each of the plurality of hierarchized nodes for a structured document including the plurality of nodes. This policy is defined as a set of multiple rules (access control rules), each of which describes whether access should be permitted or rejected for each of the nodes. In this respect, since the nodes are hierarchized, control effects (access control effects) of access permission or access rejection have dependence among nodes in the hierarchical relationship in the hierarchical structure.

Specifically, in a case where access to a particular node is permitted, access to nodes (ancestor nodes) situated higher in the hierarchy than the particular node is also permitted. Furthermore, in a case where access to a particular node is rejected, access to nodes (descendent nodes) situated lower in the hierarchy than the particular node is also rejected. As an example, in a case where a node marking a "name of a disease" exists lower in the hierarchy than a node marking a "medical record," permission of access by the patient to the name of the disease is equal to permission of access by the patient to the medical record.

Since such dependence exists, one of the following two points also have to be determined in order to determine whether access to a particular node should be permitted or rejected. One point of the two is whether access rejection has been specified for nodes higher in the hierarchy than the particular node. The other point of the two is whether access permission has been specified for every node lower in the hierarchy than nodes which are higher in the hierarchy than the particular node. For this reason, in order to determine the access control effect on a particular node, a number of rules in the policy have to be checked.

For the purpose of controlling access efficiently, the following technique has been disclosed (see: U.S. Patent Publication 2005/0076030 and Yu, T., Srivastava, D., Lakshmanan, L. V. S., and Jagadish, H. V. [2002]. "Compressed Accessibility Map: Efficient Access Control for XML," *In Proceedings of the International Conference on Very Large Databases*, pp. 478-489). In accordance with the foregoing, correspondence of the position of each of the nodes in a hierarchical structure, indicating whether access to the node position should be permitted or rejected, is stored in advance in a table, and the access control effect is efficiently obtained by means of reference to the table in response to an access request.

Access control effects may be different depending on the subject of the access requests (e.g., the access requestors and the nodes intended to be accessed). However, as far as conventional techniques are concerned, if a table entry is prepared for every access requester and for every position (path) of a node intended to be accessed in the hierarchical structure, the table size becomes larger. A scheme in which any thing which is common is shared can be adopted for the aforementioned conventional techniques in order to reduce table size.

However, in a case where there are many parts which cannot be used in common, it is likely that the table size will become larger, and that the memory space will be used to a large extent. In some cases, it is difficult to identify what range in the common parts should be updated in response to policy change. In such a case, when the policy is changed, a wide range in the table needs to be updated.

SUMMARY OF THE INVENTION

With this taken into consideration, an object of the present invention is to provide an access management apparatus, an access management method, and a program, which make it possible to solve the aforementioned problems. The object is attained by use of combinations of characteristics as recited in the independent claims. In addition, the dependent claims specify more advantageous specific examples of the present invention.

A first aspect of the present invention provides an access management apparatus which permits or prohibits access to each of a plurality of nodes stored hierarchically, as well as an access management method and a program concerning the access management apparatus. The access management apparatus includes a function storage, a receiver, a selector, an executor and a controller. The function storage stores rule functions in association with each of a plurality of mutually different requesters intending to access a node. Each of the rule functions determines whether access to the node should be permitted or rejected depending on the position of the node intended to be accessed in the hierarchical structure. The receiver receives access requests from the requesters. The selector selects the rule functions associated with the requesters of the access requests. The executor receives the position of a node, which is an object of the access requests, as an input, and thus executes the rule functions which have been selected by the selector. The controller controls permission of, or prohibition of, the access requests on the basis of a result of determining whether the access should be permitted or rejected, the determination result having been obtained by executing the rule functions.

A second aspect of the present invention provides an access management apparatus which permits or prohibits access to each of a plurality of nodes stored hierarchically, as well as an access management method and a program concerning the access management apparatus. The access management apparatus includes a function storage, a receiver, a selector, an executor and a controller. The function storage stores rule functions for determining whether access should be permitted or rejected corresponding to a requester of an access request, in association with each of the positions of a plurality of mutually different nodes. The receiver receives the access request from the requester. The selector selects the rule function associated with the position of the node intended to be accessed. The executer receives the requester of the access request as an input, and thus executes the rule function which has been selected by the selector. The controller controls permission of, or prohibition of, the access request on the basis of a result of determining whether the access should be permitted or rejected, the determination result having been obtained by executing the rule function.

It should be noted that the aforementioned summary of the invention does not necessary enumerate all of the characteristics necessary for the present invention. Sub-combinations of these groups of the characteristics can also comprise the invention.

BRIEF DESCRIPTION OF THE DRAWINGS

For a more complete understanding of the present invention and the advantage thereof, reference is now made to the following description taken in conjunction with the accompanying drawings wherein:

FIG. 4 shows an example of a policy stored in a policy storage according to an embodiment of the present invention;

FIG. 5 shows an example of a mapping table according to an embodiment of the present invention;

FIG. 6 shows an example of an instance storage according to an embodiment of the present invention;

FIG. 8 shows an example of a rule function stored in the function storage according to an embodiment of the present invention;

FIG. 10 shows an example of the mapping table according to a first modified example of the embodiment of the present invention;

FIG. 11 shows an example of a rule function according to a modified example of an embodiment of the present invention;

FIG. 13 shows an example of a mapping table according to an alternative embodiment of the present invention;

FIGS. 15A and 15B respectively show examples of a rule function according to an embodiment of the present invention;

FIGS. 16A and 16B respectively shows other examples of the rule function according to an embodiment of the present invention.

DETAILED DESCRIPTION OF THE PREFERRED EMBODIMENTS

Hereinafter, descriptions will be provided for the present invention giving representative embodiments of the present invention. The below-described embodiments do not limit the invention as recited in the claims. In addition, all combinations of characteristics which will be described with regard to the embodiments are not necessarily essential for the means for the present invention to solve the problems.

Figure 1:
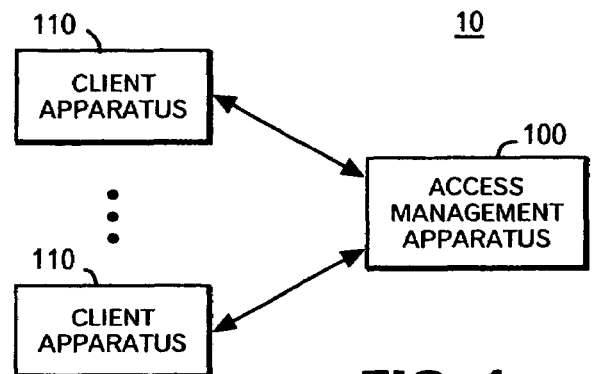
FIG. 1 is a configuration of an information system 10 according to an embodiment of the present invention.

FIG. 1 is a configuration of an information system 10 according to this embodiment. The information system 10 is characterized by including an access management apparatus 100 and one or more client apparatuses 110. The access management apparatus 100 stores data. Each of the client apparatuses 110 accesses the data which are stored in the access management apparatus 100. The information system 10 is characterized in that the access management apparatus 100 efficiently determines whether access to the data should be permitted or rejected.

The access management apparatus 100 stores, for example, a hierarchical data structure, such as a structured document. The data structure has a configuration in which a plurality of nodes are connected to one another hierarchically, and in which data are associated with each of the nodes. In addition, on the basis of a predetermined policy, the access management apparatus 100 permits, or rejects, access from a client apparatus 110 to each of the plurality of nodes which have been stored hierarchically.

Figure 2:
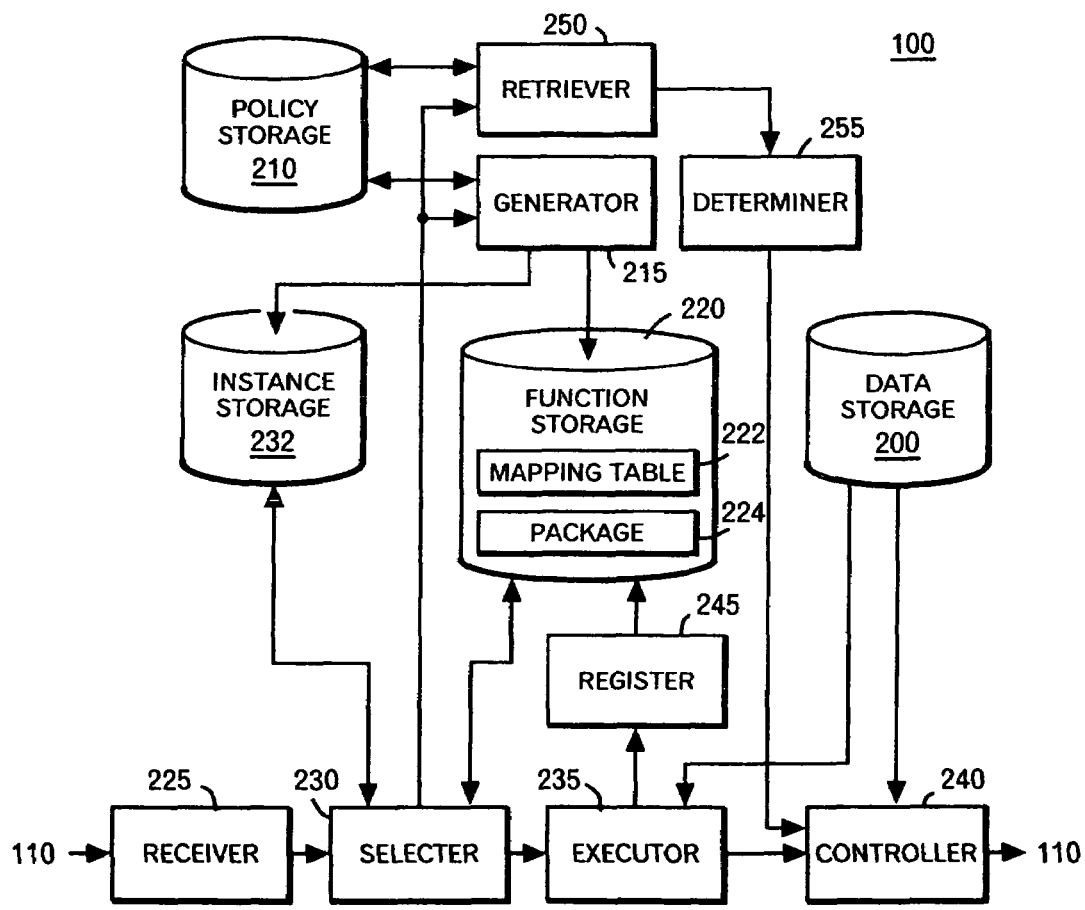
FIG. 2 shows a configuration of an access management apparatus according to the embodiment of the present invention.

FIG. 2 shows a configuration of the access management apparatus 100 according to this embodiment. The access management apparatus 100 includes a data storage 200, a policy storage 210, generator 215, a function storage 220, a receiver 225, a selector 230, an instance storage 232, an executor 235, a controller 240, and a register 245, a retriever 250 and a determiner 255.

The data storage 200 stores a hierarchical data structure. The policy storage stores policies on which it is determined whether an access to a data structure stored in the data storage 200 should be permitted or rejected. More specifically, the data storage 200 stores the policies by means of storing a plurality of rules each including a set of a requester of the access, a position (path) of a node intended to be accessed in the hierarchical structure, and information on whether the access by the requester to the node should be permitted or rejected. In the case of this embodiment, the requester of the access is a subject of the request of the access. An access requester is assigned to each of the users (accounts) of the information system 10. Alternatively, an access requester may be associated with, and thus assigned to, each client apparatus 110.

The generator 215 selects one or more out of the plurality of rules stored in the policy storage 210, and thus generates a rule function for determining whether access should be permitted or rejected, the rule function corresponding to the rules. Thereby, the generator 215 generates a plurality of rule functions each for determining whether the access should be permitted or rejected, the plurality of rule functions corresponding to parts of rules which are different from one another. Accordingly, this makes it possible to convert policies stored in the policy storage 210 to a set of rule functions.

As an example, the generator 215 according to this embodiment generates a rule function for determining whether an access corresponding to an access request from the requester should be permitted or rejected for each of a plurality of mutually different requesters which are likely to access a node. For example, the generator 215 may generate rule functions which are different from one requester to another. Alternatively, the generator 215 may generate a single rule function for two or more groups of requesters, and thus assign a rule function, which is different from the single rule function, to each of a plurality of requesters belonging to a group different from the two or more groups. This rule function receives parameters including a position of a node intended to be accessed in the hierarchical structure, and determines whether the access should be permitted or rejected in response to the position. In this embodiment, the generator 215 generates the rule functions as method functions in an object-oriented language classes, such as Java (registered trademark). Then, the generator 215 compiles the classes including the method functions, and thus converts the result to an object code of JVM (Java Virtual Machine).

The function storage 220 stores rule functions which have been generated by the generator 215. In association with each of a plurality of mutually different requesters, the function storage 220 according to this embodiment stores a rule function for determining whether the access corresponding to the access request from the requester should be permitted or rejected. More specifically, the function storage 220 stores one or more classes, including one or more rule functions, collectively as a package 224. Moreover, in association with each of a plurality of mutually different requesters, the function storage 220 stores a pointer for indicating each of the plurality of mutually different rule functions. The pointers may be the names of the rule functions or character strings and the like, which indicate sets of package names, class names and method names.

The receiver 225 receives an access request from a requester which has been transmitted by the client apparatus 110. The selector 230 selects a rule function to be used for determining whether the access corresponding to the access request should be permitted or rejected, from within the function storage 220. In other words, in the case of this embodiment, the selector 230 selects the rule function associated with the requester of the access request.

The instance storage 232 is used in a case where each rule function is implemented by use of the object-oriented language classes, and stores identities of instances in each of the classes. The executor 235 executes the rule function which has been selected by the selector 230. The controller 240 controls permission or denial of the access request on the basis of a result of determining whether the access should be permitted or rejected. The result is obtained as a consequence of execution of the rule function by the executor 235. Subsequently, in a case where the access request is permitted, the controller 240 reads, from the data storage 200, data associated with the node intended to be accessed, and transmits the data to the client apparatus 110 which is the requester.

The register 245 associates the result of the determination, which has been obtained as the consequence of the execution of the rule function, with the requester and the position of the node, to which the access request has been directed. Then, the register 245 registers the result of the determination to the function storage 220. By this, the selector 230 can provide the registered result of the determination to the controller 240 if the selector 230 once again receives a request for access to the same node from the same requester. In this case, the rule function need not be calculated by the executor 235, which makes it possible to improve the efficiency of the access process.

The retriever 250 retrieves, from the policy storage 210, one or more rules to be used for determining whether an access request should be permitted or rejected. The condition for the retriever 250 to do so is that a rule function for determining whether an access corresponding to the access request should be permitted or rejected has not previously been stored in the function storage 220. On the basis of one or more rules which have been retrieved by the retriever 250, the determiner 255 determines whether the access corresponding to the access request should be permitted or rejected, and provides the result of the determination to the controller 240. Accordingly, this makes it possible for the access management apparatus 100 to determine whether access should be permitted or rejected, on the basis of policies which have been stored in the policy storage 210, even in the case where the necessary rule function has not yet been stored in the function storage 220.

In the case of the access management apparatus 100 shown above, policies in the policy storage 210 are converted to a set of a plurality of rule functions, and thus a rule function corresponding to an access request is executed. Thereby, it is determined whether the access should be permitted or rejected. Accordingly, this makes it possible for the access management apparatus 100 to determine whether an access should be permitted or rejected at a higher speed in comparison with a case where, each time an access request is received, rules in the policies are retrieved, and thereafter it is determined whether the access should be permitted or rejected. As well, in the case of the access management apparatus 100, rule functions, which are different depending on parameters of access requests (e.g., on requesters and/or positions of nodes intended to be accessed) are prepared. Accordingly, this makes it possible for the access management apparatus 100 to easily identify rule functions which have to be changed in a case where parts of the rules in the policy storage 210 are changed. This also makes it possible for the access management apparatus 100 to deal with new policies by means of changing as few rule functions as possible.

It should be noted that, as long as the aforementioned conditions are satisfied, it does not matter that the access management apparatus 100 is realized by use of a plurality of information processors. As an example, the access management apparatus 100 may include an information processor for generating rule functions and an information processor for processing access requests. In this case, the information processor for generating rule functions is packaged with the policy storage 210, the generator 215, the retriever 250, and the determiner 255, which generate rule functions on the basis of policies in the policy storage 210. The information processor for processing access requests is packaged with the data storage 200, the function storage 220, the receiver 225, the selector 230, the instance storage 232, the executor 235 the controller 240 and the register 245.

Figure 3:
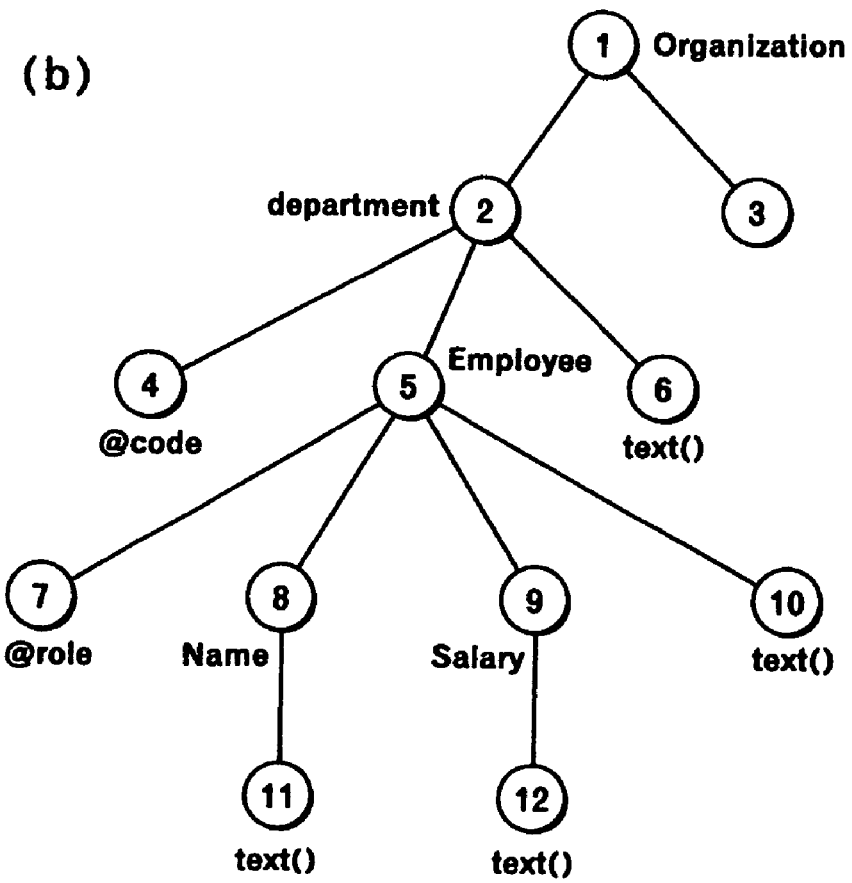
FIGS. 3A and 3B show examples of a structured document stored in a data storage according to an embodiment of the present invention.

FIGS. 3A and 3B show examples of a structured document 300 stored in the data storage 200 according to this embodiment. FIG. 3A shows a structured document 300 in the XML format or the like which is stored in the data storage 200. As an example, each of the nodes included in the hierarchical structure is an element object including a start tag marking a position at which description of information starts and an end tag marking a position at which the description of the information ends. In FIG. 3, for example, a node uppermost in the hierarchy is an Organization object including <Organization> which is its start tag and </Organization> which is its end tag.

As another example, it does not matter that a node is an attribute object marking the attribute of the element object including the start tag and the end tag. In FIG. 3, the code object marking the attribute of the department object is an example of the attribute object. From another viewpoint, an attribute object can be regarded as a variable in a node which is an element object.

In addition, it does not matter that the structured document 300 includes a plurality of Employee objects which are assigned respectively to employees to be managed.

FIG. 3B shows the hierarchical structure of the structured document 300 stored in the data storage 200. As shown in FIG. 3B, the plurality of nodes constituting the hierarchical structure constitutes a tree structure, for example. When the data storage 200 stores the structured document 300, the data storage 200 stores the plurality of nodes hierarchically in the tree structure where the node uppermost in the hierarchy is the root node. In the case of this example, the root node is Organization. The leaf nodes lowermost in the hierarchy are @code, @role, and the like.

With regard to the hierarchical structure of the structured document 300, a set of a start and end tags described between a start and end tags marking a certain node describes a node which is lower in the hierarchy than the certain node. For example, the Name object and the Salary object are described between the start tag and the end tag of the Employee object in the structured document 300. The Name object and the Salary object are nodes which are lower in the hierarchy than the node corresponding to the Employee object. In addition, a node marking the attribute of a certain node is a node which is lower in the hierarchy than the certain node. For example, the role object marking the attribute of the Employee object in the structured document 300 is a node which is lower in the hierarchy that the node corresponding to the Employee object. In FIG. 3B, each of the nodes marking attributes is expressed with @ placed at the beginning of the node. Furthermore, in FIG. 3B, the plurality of text data described corresponding respectively to the nodes in the structured document are denoted by text( ) which marks a text data.

A position of each of the nodes in the hierarchical structure is expressed with a character string which sequentially includes the names of nodes on the paths from the root node through the node, and which is obtained by concatenating the names of the nodes to one another with delimiters, including '/'. As an example, the position of the node corresponding to department is represented by a path expression of /Organization/department.

It should be noted that data in the hierarchical structure may be a document described by use of SGML, HTML or the like, instead of XML shown by the example of FIG. 3B. Accordingly, each of the nodes may be an object marked by a set of its start and end tags, or may be an attribute, as in the case of XML. Moreover, as another example, the data in the hierarchical structure may be data recorded in a file system of a storage device. In this case, each of the nodes is a file or a folder. As well, a file stored in a certain folder is a node which is lower in the hierarchy than a node marking the folder.

FIG. 4 shows an example of a policy 410 stored in the policy storage 210 according to this embodiment. The policy storage 210 associates a number of rules 400 (400a to 400l) with requesters and positions of nodes in the hierarchical structure, and thus stores the rules. Each of the rules indicates information on whether access to a node by a requester should be permitted or rejected. The rules 400 according to this embodiment set the information on whether an access to a node by a requester should be permitted or rejected for +r, +R and −R. The rule +r sets up permission for access to an object node. +R sets up permission for access to an object node and all of the descendant nodes of the object node. −R sets up rejection of an access request to an object node and all of the descendant nodes of the object node. In this respect, descendent nodes of an object node means nodes, except for the object node, positioned on the paths from the object node through leaf nodes lowermost in the hierarchy.

The rule 400a, for example, indicates that an access request from a subject Taro to a node in a position /a is permitted (+r). The rule 400b indicates that access by subject Taro to a node in a position /a/b and its descendant nodes is permitted (+R). In this regard, the policy storage 210 may stores the rules 400 in the text format. Alternatively, the policy storage 210 may convert the rules 400 in the text format to the rules 400 in the internal data format for the access management apparatus 100, and thus store the resultant rules 400.

Among rules each indicating information on whether access is permitted or rejected, there are rules for propagating an access control effect to not only an object node, but also to all of the descendent nodes of the object node. Such rules (for example, rules 400b and 400c) will be hereinafter referred to as "propagation rules." If a person who sets up the policies 410 uses a propagation rule, the person can describes, in response to an object node, whether access to all of the nodes included in a subtree in which the object node is uppermost in the hierarchy should be permitted or rejected, by use of a single rule 400.

The two following requirements are prerequisites for the policies 410 according to this embodiment.

(1) Solution of Contradiction

Both of "permission for" and "rejection of" access to a single node can be set up depending on combinations of rules 400. For example, in FIG. 4, permission for access to a node in a position /a/b/c/e is set up for an access request from Taro by the rule 400b, and concurrently rejection of the access is set up by the rule 400c. In a case where both access permission and access rejection are set up, the access management apparatus 100 solves the contradiction by giving priority to the access rejection. As a result, in the case of the aforementioned example, the access management apparatus 100 prohibits access by Taro to the node in the position a/b/c/e. Accordingly the policy 410 may be determined regarding access to a node by which both access permission and access rejection are set up can be permitted.

(2) Default Access Control Effect

A default access control effect is set up for any node on which none of the rules 400 determine whether an access to a node should be permitted or rejected. In the case of the access management apparatus 100 according to this embodiment, access rejection is used as the default access control effect. It does not matter that, instead, access permission is used as the default access effect in the case of the access management apparatus 100.

FIG. 5 shows an example of a mapping table 222 according to this embodiment. The mapping table 222 associates pointers and caches with the respective requesters which are examples of the parameters of access requests. Thus, the mapping table 222 stores the pointers and caches. Each of the pointers includes a package name, a class name and a method name, each of which specify a corresponding rule function. Each of the caches contains information on whether an access should be permitted or rejected, and the information is registered by register 245.

For example, the mapping table 222 shown in FIG. 5 associates a package name pkg1, a class name Cls1 and a method name method1 with a requester Hana, and stores the names. The names indicate a rule function for determining whether an access request from Hana should be permitted or rejected. In addition, the mapping table 222 shown in FIG. 5 associates two access permissions (+r) with the requester Hana, and thus caches the two access permissions (+r) as a determination result "which has been registered by the register 245 in response to an access request received in the past." One of the two access permissions (+r) is concerned with access to a node in a position /a. The other of the two access permission (+r) is concerned with access to a node in a position a/b. It is to be noted that the mapping table 222 shown in FIG. 5 has not stored a rule function corresponding to a requester Tom. That is because the rule function corresponding to the requester Tom has not yet been generated.

FIG. 6 shows an example of the instance storage 232 according to this embodiment. The instance storage 232 stores identities respectively of the instances in each class, which includes one or more method functions. The identities may be pointers indicating the instances in the class.

For example, the instance storage 232 stores an identity Ins1 of an instance of a class specified by a package name pkg1 and a class name Cls1. In this case, the executor 235 can call a rule function implemented as a method function of the class by use of the identity. That is because the class has already been instantiated. By contrast, the instance storage 232 does not store an identity of an instance of a class specified by a package name pkg1 and a class name Cls2. In this case, the selector 230 instantiates the class, before the selector 230 calls a rule function which would otherwise be implemented as a method function of the class. That is because the class has not yet been instantiated.

Figure 7:
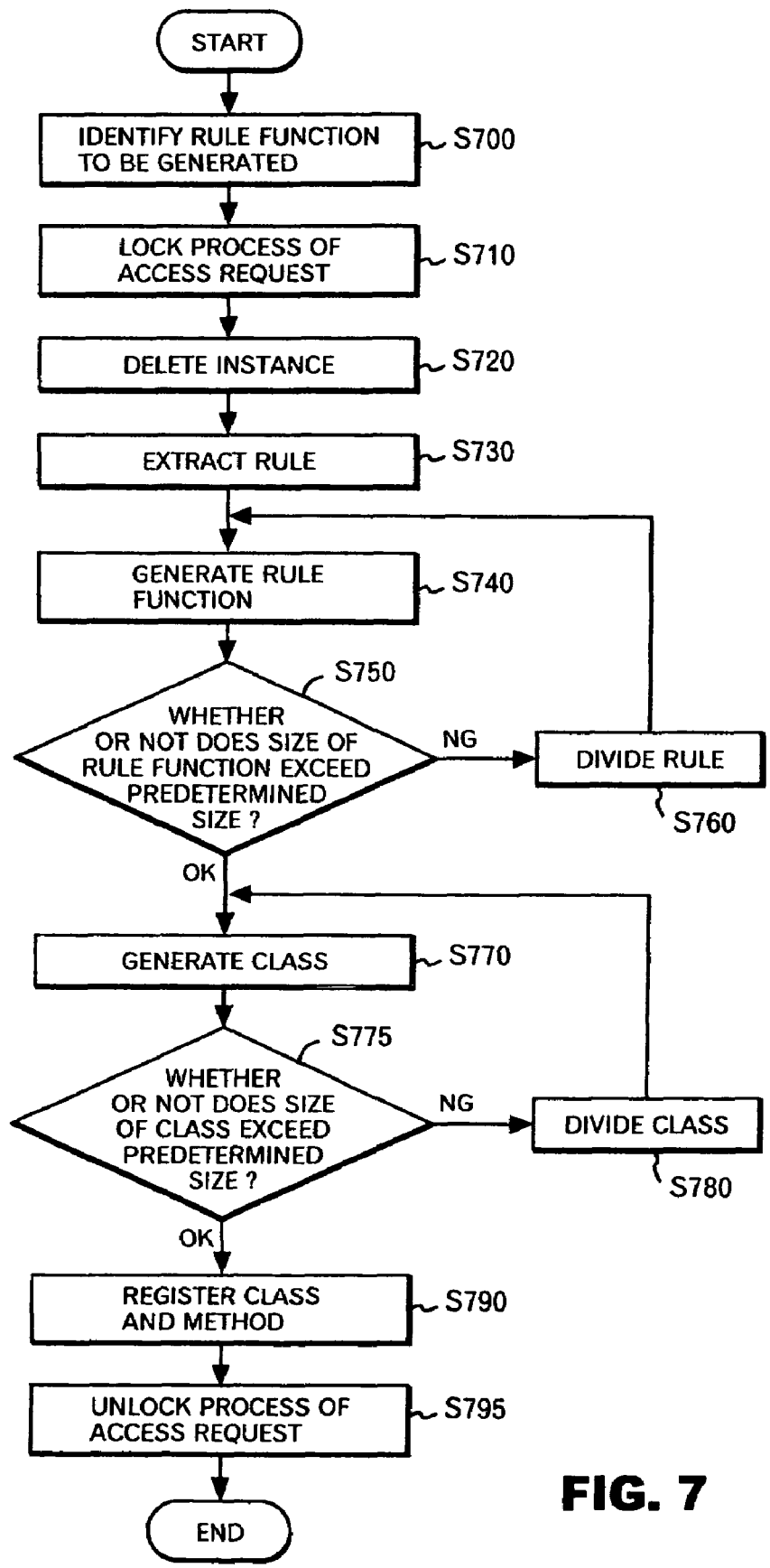
FIG. 7 shows a flow of an operation for the access management apparatus according to an embodiment of the present invention to generate a rule function.

FIG. 7 shows a flow of an operation for the access management apparatus 100 according to this embodiment to generate a rule function. First, the generator 215 identifies a rule function to be generated (in step S700). In a case where the whole policies have been newly stored in the policy storage 210, the generator 215 may determine that rule functions corresponding respectively to the policies be generated. In addition, in a case where parts of the rules in the policy storage 210 have just been updated, or in a case where parts of the rules have just been added or deleted, the generator 215 identifies rule functions to be updated in response to the change. In the case of this embodiment, rule functions, which are different depending on requesters, are used. Accordingly, it is possible to identify rule functions corresponding to requesters as rule functions to be updated. Those requesters are requesters who were included in previous rules before the rules were changed, and requesters who are included in new rules obtained by the change of rules.

Subsequently, the generator 215 locks the processing of an access request which is performed using the rule functions to be updated (in step S710). The generator 215 is designed to update rule functions for each class. For this reason, the generator 215 locks the entire class including the rule functions to be updated. In order to implement this, it does not matter that the generator 215 retrieves, from the mapping table 222, the package name and the class name of the class including the rule functions to be updated while the generator 215 locks entry into the mapping table corresponding to the class or into the instance storage 232. Accordingly, it is possible for the selector 230 to delay processing the access request under a condition that the entry into the mapping table 222 corresponding to the access request or into the instance storage 232 is locked. The selector 230 may inform the client apparatus 110 that the access request is temporarily not being processed via the executor 235 and the controller 240.

Thereafter, the generator 215 deletes the instance of the class including the rule functions to be updated from the instance storage 232, thereby releasing the instance (in step S720).

Then, the generator 215 extracts, from the policy storage 210, one or more rules which will be used as the basis of the new rule functions to be obtained by the update (in step S730). The generator 215 according to this embodiment extracts one or more rules concerning a requestor corresponding to each of the rule functions to be obtained by the update.

Next, on the basis of one or more rules concerning each single requester, the generator 215 generates a rule function corresponding to the requestor (in step S740). In this respect, in a case where a single rule function is going to be associated with two or more requesters, the generator 215 may generate the single rule function corresponding to the two or more requesters on the basis of one or more rules concerning the two or more requesters. As an example, the generator 215 may generate common rule functions corresponding to the two or more requesters on the basis of two or more rules concerning predetermined two or more requesters.

In the case where the generator 215 is going to generate a rule function, first of all, the generator 215 generates a source code of the rule function corresponding to the requester on the basis of two or more rules concerning a single requester or concerning two or more requesters. Subsequently, the generator 215 compiles the source code, thereby generating an object code of the rule function.

Thereafter, the generator 215 checks on the size of the rule function thus generated (in step S750). In a case where the size of the rule function exceeds a predetermined size (in the case of NG in step S750), the generator 215 divides the rules into a plurality of sets of rules (in step S760), and generates a rule function for each set of rules (in step S740). For example, in a case where the generator 215 is going to generate a single common rule function for two or more requesters, the generator 215 may divide the two or more requesters into a plurality of groups, thus generating a single rule function for each of the groups.

Subsequently, the generator 215 generates a class into which one or more generated rule functions are put together (in step S770). In this respect, in a case where the size of the class exceeds a predetermined size (in the case of NG in step S775), the generator 215 divides the class, and thereby decreases the number of rule functions included in each of the classes obtained by the division (in step S780). Thus, the generator 215 generates classes once again (in step S770).

Next, the generator 215 registers the class and a method function which serves as the rule function in the mapping table 222 and the instance storage 232 (in step S790). More specifically, the generator 215 causes the instance storage 232 to store the package name and the class name of the class. In addition, the generator 215 causes the mapping table 222 to store the package name, the class name, and method name of the method function, which serves as the rule function, as information for identifying the object code of the rule function. Moreover, the generator 215 registers the class newly generated in the package 224.

After the aforementioned processes are completed, the generator 215 unlocks the access request, and enables the ensuing access requests to be processed (in step S795).

The above-described generator 215 can adequately select a rule function corresponding to a requester on which a rule have been changed, and can update nothing but the selected rule function. In addition, the generator 215 can cause the function storage 220 to store a rule function and a class, which has been generated for the update, under the following conditions. One of the conditions is that the size of the rule function thus generated is not larger than the predetermined size. The other of the conditions is that the size of the class thus generated is not larger than the predetermined size.

Accordingly, this makes it possible for the generator 215 to generate an adequate rule function and an adequate class which meet the size restrictions imposed by the implementation of Java (registered trademark) or the like.

FIG. 8 shows an example of a rule function stored in the function storage 220 according to this embodiment. The generator 215 extracts the rules 400a to 400c concerning the requester Taro from the policy storage 210 in step S730 of FIG. 7. Subsequently, in step S740 of FIG. 7, the generator 215 generates the rule function shown in FIG. 8 on the basis of the extracted rules 400a to 400c. Then, in step S770 of FIG. 7, the generator 215 generates a class Cls1 including the rule function as a method function method1. Thereafter, in step S790 of FIG. 7, the generator 215 registers the class Cls1 in a package pkg1, and concurrently causes the rule function to be stored in the mapping table 222.

The rule function generated by the generator 215 is implemented as the method function method1 in the class Cls1. The method function method1 receives the position of a node intended to be accessed, as a character string parameter accessedPath, in its first line. Then, in its second, fourth and sixth lines, the method function method1 sequentially compares the position of the node intended to be accessed with constants '/a/b/c', '/a/b' and '/a' which mark positions included respectively in the rules 400c, 400b and 400a concerning the requester. Subsequently, in a case where the position of the node intended to be accessed agrees with any one of the constants, the method function method1 returns information on whether the access should be permitted or rejected as a result of the determination. The information is combined with the requester and the position marked by the agreed constant into a set. In other words, for example, in a case where accessdPath agrees with the constant '/a' in the sixth line, the method function returns the access permission (true), as the result of the determination, on the basis of the information on the access permission +r, the latter information being combined with the requester Taro and the position /a marked by the constant into the set.

In this respect, with regard to the rule 400c for propagating an access control effect, the generator 215 generates the following rule function under the following condition. The rule function returns information on access rejection –R (=false), as a result of the determination, the information having been specified by the propagation rule (in the third line). The condition is that the character string accessedPath includes the character string '/a/b/c' in its beginning (in the second line). The character string accessedPath marks the position of the node intended to be accessed. The character string 'a/b/c' marks the position of a node uppermost in the subtree of the node on which the access control effect is exercised (in the second line). With regard to the propagation rule 400b, the generator 215 similarly returns information on access permission +R (=true), under a condition that the character string accessedPath includes the character string '/a/b' (in the fourth line). The information has been specified by the propagation rule 400b.

The generator 215 according to this embodiment gives priority to setup of access rejection rather than setup of access permission. For this purpose, the generator 215 decides a sequence of processing rule functions in a way that rules indicating the access rejection are checked on and thereafter rules indicating the access permission are checked on. In other words, in the case where, under the following condition, the generator 215 is going to generate a rule function which returns a result of determining that the access is rejected, the generator 215 decides the process sequence in order that, first of all, the generator 215 can determine whether or not a node intended to be accessed is included in a subtree specified by any one of the propagation rules which indicates access rejection (–R). The condition is that the node intended to be accessed is included in the subtree specified by any one of the propagation rules which indicates the access rejection (–R). Subsequently, in a case where the node intended to be accessed is not included in the subtree specified by any one of the propagation rules which indicates access rejection (–R), the generator 215 decides a rule function in order that the rule function can return a result of determining that the access is permitted, under a condition that the access is permitted on the basis of any one of rules indicating access permission (+R, +r).

In addition, the generator 215 sets up access rejection, as a default, for a node for which none of the rules 400 have set up whether the access is permitted or rejected. For this purpose, the generator 215 is designed to return the result of determining that the access is rejected (=false), in a case where the node does not meet a condition corresponding to any one of the rules 400.

It should be noted that there is a mode which discriminates between permission of access to the node (+r) and access permission based on a propagation rule of an ancestor node (permission of the access to the ancestor node +R with no setup of whether the node concerned is permitted or rejected), and which returns one of the two. In the case of such mode, it does not matter that the generator 215 generates a rule function in order that a rule for permitting access to the lower node can be checked on before a rule for permitting access to the upper node.

Figure 9:
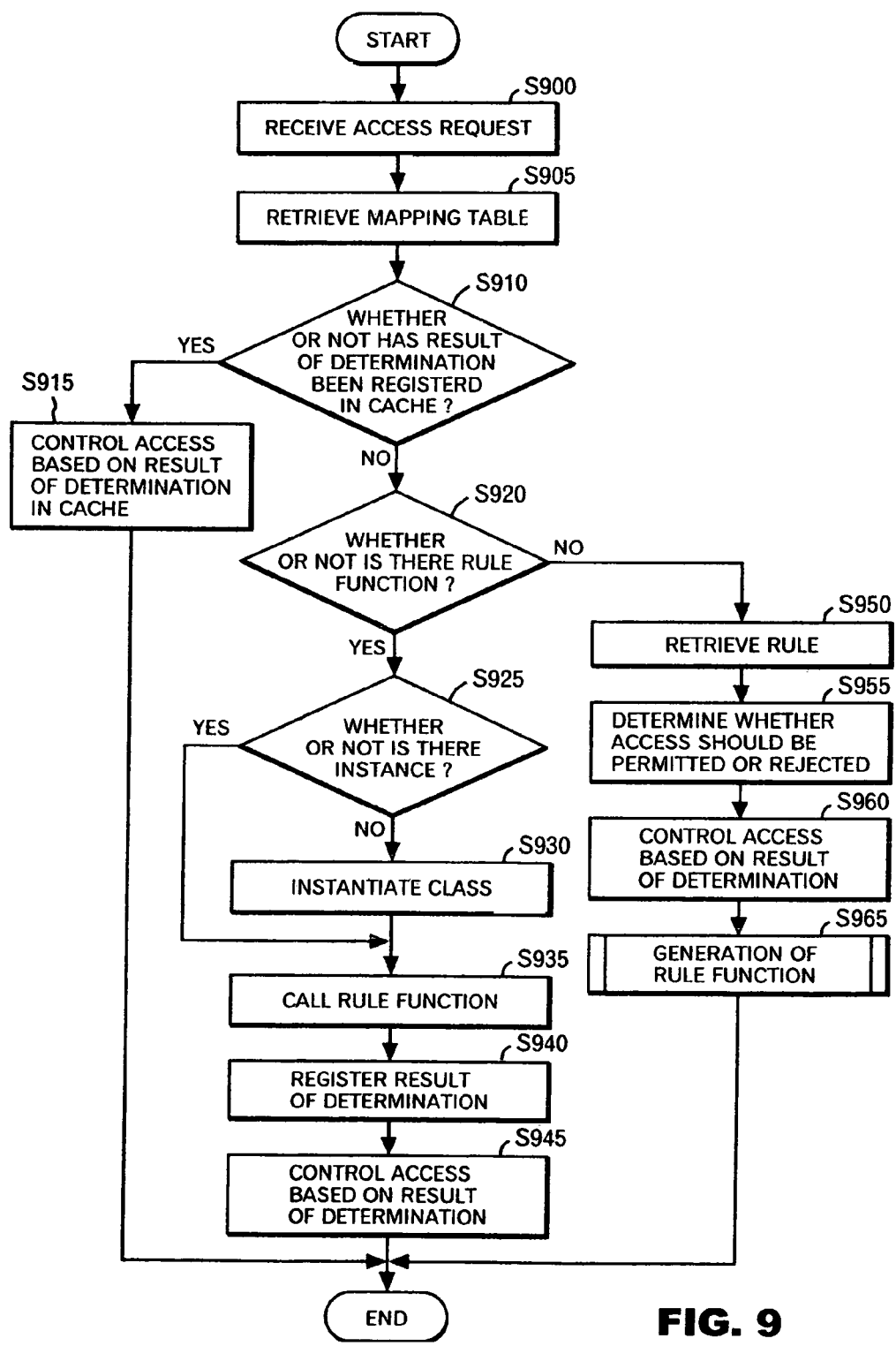
FIG. 9 shows a flow of an operation for the access management apparatus according to an embodiment of the present invention to control access.

FIG. 9 shows a flow of an operation for the access management apparatus 100 to control access according to an embodiment of the invention.

First of all, the receiver 225 receives, from the client apparatus 110, an access request from a requester, and supplies the access request to the selector 230 (in step S900). Then, the selector 230 retrieves an entry corresponding to the requester from within the mapping table 222 (in step S905).

In a case where, in a cache of the entry corresponding to the requester, a result of the determination has already been registered in association with the node corresponding to the access request (i.e., a "Yes" determination in step S910), the selector 230 passes the result of the determination in the cache to the controller 240 via the executor 235. Upon receipt of this, the controller 240 controls the access on the basis of the result of the determination in the cache (in step S915). In other words, in a case where the result of the determination indicates access permission, the controller 240 replies with data corresponding to the node intended to be accessed and sends it to the client apparatus 110. The data are in a structured document stored in the data storage 200. On the other hand, in a case where the result of the determination indicates access rejection, the controller 240 responds to the client 110 with access rejection. Accordingly, this makes it possible for the selector 230 to provide the controller 240 with a result of a determination which has been registered in the function storage 220 in association with a requester and a node, without causing the executor 235 to execute a rule function associated with the requester, in response to reception from the requester of the recurrent request of access to the node, the requester having previously made an access request to the same node. Subsequently, on the basis of the result of the determination which has been provided by the selector 230, the selector 240 can control permission of, or prohibition of, the recurrent access request.

On the other hand, in a case where the result of the determination which would otherwise be associated with the node corresponding to the access request has not been stored in the cache corresponding to the requester (i.e., a "No" determination in step S910), the selector 230 acquires a pointer of the rule function associated with the requester (in the case of "Yes" in step S920). Subsequently, the selector 230 acquires, from the instance storage 232, an instance identity of a class including the rule function, by use of the package name and the class name which are included in the pointer of the rule function which has been acquired from the mapping table 222. In the case where the identity of an instance of the class including the rule function thus selected has not yet been stored in the instance storage 232 (i.e., a "No" determination in step S925), the selector 230 generates the instance of the class, and stores the identity of the instance in the instance storage 232 (in step S930). Therefore, the selector 230 may process "instance identity instance_id=new Cls1( )" and the like, and thereafter call a constructor of the class Cls1, thus generating and initializing the instance.

Next, the executor 235 executes the rule function, which has been selected by the selector 230, by using the position of the node, which is an object of the access request, as an input parameter (in step S935). In other words, the executor 235 calls a rule function specified by a pointer which has been acquired from the mapping table 222, and thus executes the rule function. The executor 235 according to this embodiment calls the method function of the instance of specified by the instance identity which has been acquired from the instance storage 232, and thus executes the rule function. As a consequence of executing the rule function, the executor 235 can obtain a result of determining whether the access should be permitted or rejected.

Next, the register 245 associates the result of the determination, which has been obtained as the consequence of executing the rule function, with the requester and the position of the node which is the object of the access request. Thus, the register 245 registers the result thus associated in the function storage 220 (in step S940). Subsequently, upon receipt of the result of the determination from the selector 230, the controller 240 controls permission of, or prohibition of, the access request, and thus completes processing the access request.

In addition, in a case where, in step S920, the rule function corresponding to the requester has not been present in the mapping table 222 (in the case of a "No" in step S920), the selector 230 posts the absence to the retriever 250. Upon receipt of this notification, the retriever 250 retrieves one or more rules to be used for checking on the access request (in step S950) from the policy storage 210. Subsequently, on the basis of the one or more rules which have been retrieved, the determiner 255 determines whether the access corresponding to the access request should be permitted or rejected (in step S955). Upon receipt of a result of this determination, the controller 240 controls permission of, or prohibition of, the access request (in step S960).

As well, under a condition that no rule function associated with the requester of the access request received has been stored (in the case of a "No" in step S920), the generator 215 generates a rule function corresponding to the requester as in the case shown in FIG. 7 (in step S965). Then, the generator 215 causes the identity of the rule function to be stored in the mapping table 222. Concurrently, the generator 215 registers, in the package 224, an object code of a class including the rule function which has been newly generated.

The above-described access management apparatus 100 converts policies in the policy storage 210 to a set of a plurality of functions, and thus executes a rule function corresponding to an access request. Thereby, the access management apparatus 100 determines whether the access should be permitted of rejected. Accordingly, this makes it possible to determine whether an access should be permitted or rejected at a high speed in comparison with the case where, each time an access request is received, it is determined whether access should be permitted or rejected, by means of retrieving a rule from within the policies. In particular, in the case where, without use of the access management apparatus 100, it is determined whether access should be permitted or rejected, by means of retrieving a rule from within the policies, all of the policies need to be searched each time the access request is received. As a result, it is desirable that all of the policies be expanded in memory. By contrast, the access management apparatus 100 according to this embodiment individually instantiates a class including the rule function depending on the necessity. For this reason, rule functions which receive no access request need not be expanded in the memory. Accordingly, this makes it possible for the access management apparatus 100 to control access efficiently with smaller memory space used.

Furthermore, in a case where no rule function has been stored in the function storage 220, the retriever 250 and the determiner 255 can retrieve a policy from within the policy storage 210, and can accordingly determine whether the access should be permitted or rejected. As a result, the access management apparatus 100 can efficiently perform access control on an access request of which a rule function has been registered. Concurrently, the access management apparatus 100 can duly perform access control on an access request of which no rule function has been registered. While the number of incoming access requests is larger than a predetermined value, or during a predetermined time period that many access requests are more likely to come in, access control may be performed by the retriever 250 and the determiner 255 with regard to an access request on which no rule function has yet been registered. While the number of incoming access requests is not larger than a predetermined value, or during a predetermined time period that many access requests are less likely to come in, rule functions which have not yet been registered may be generated by the generator 215.

FIG. 10 shows an example of the mapping table 222 according to a first modified example of this embodiment. The configuration and operations of the access management apparatus 100 according to this modified example are similar to those of the access management apparatus 100 shown in FIG. 2. Hereinafter, descriptions will be omitted except for what makes the former access management apparatus different from the latter access management apparatus.

The mapping table 222 according to this modified example associates a rule function with positions of a plurality of nodes which are different from one another, and stores the resultant rule function. The rule function determines whether an access should be permitted or rejected in response to a requester of the access request. For example, the mapping table 222 shown in FIG. 10 stores a method name method1 in association with a position /a of an object node. This method is a rule function which returns the access control effect of the position /a of the object node to all of the requesters.

FIG. 11 shows an example of a rule function according to the first modified example of this embodiment. The generator 215 according to this modified example extracts, from the policy storage 210, rules 400a, 400d, 400g and 400j concerning the position /a of the object node. Subsequently, in step S740 of FIG. 7, on the basis of the extracted rules 400a, 400d, 400g and 400j, the generator 215 generates a rule function as shown in FIG. 11.

In the case of this modified example, a rule function generated by the generator 215 is implemented as a method function method1 of a predetermined class Cls1. In the case of this modified example, the generator 215 includes all of the rule functions in the common class Cls1. However, it does not matter that the generator 215 divides the rules into a plurality of classes, and includes them in the classes. The method function method1 receives a requester of an access request as a character string parameter sbj in its first line. Then, in its second, fourth, sixth and eighth lines, the method function method1 sequentially compares the requester sbj of the access request with constants 'Taro', 'Hana', 'Tom' and 'Alice' of character strings respectively marking a plurality of mutually different requesters which are permitted to access their own object nodes. Subsequently, in a case where any one of the constants agrees with sbj marking the requester of the access request, the method function method1 returns information on whether the access should be permitted or rejected with regard to the position /a which is combined with the requester marked by the constant into a set.

It should be noted that, in the case of this modified example, the rule function returns access permission or access rejection by use of information instead of by use of the logical values. The information is that which identifies an access control effect which has been set up for the node proper. The information includes: 0 (zero) in a case where access rejection (−R) has been set up for the node proper; 1 (one) in a case where no access control effect has been set up; 2 (two) in a case where access permission without propagation to descendent nodes (+r) has been set up; and 3 (three) in a case where access permission with propagation to descendent nodes (+R) has been set up.

Figure 12:
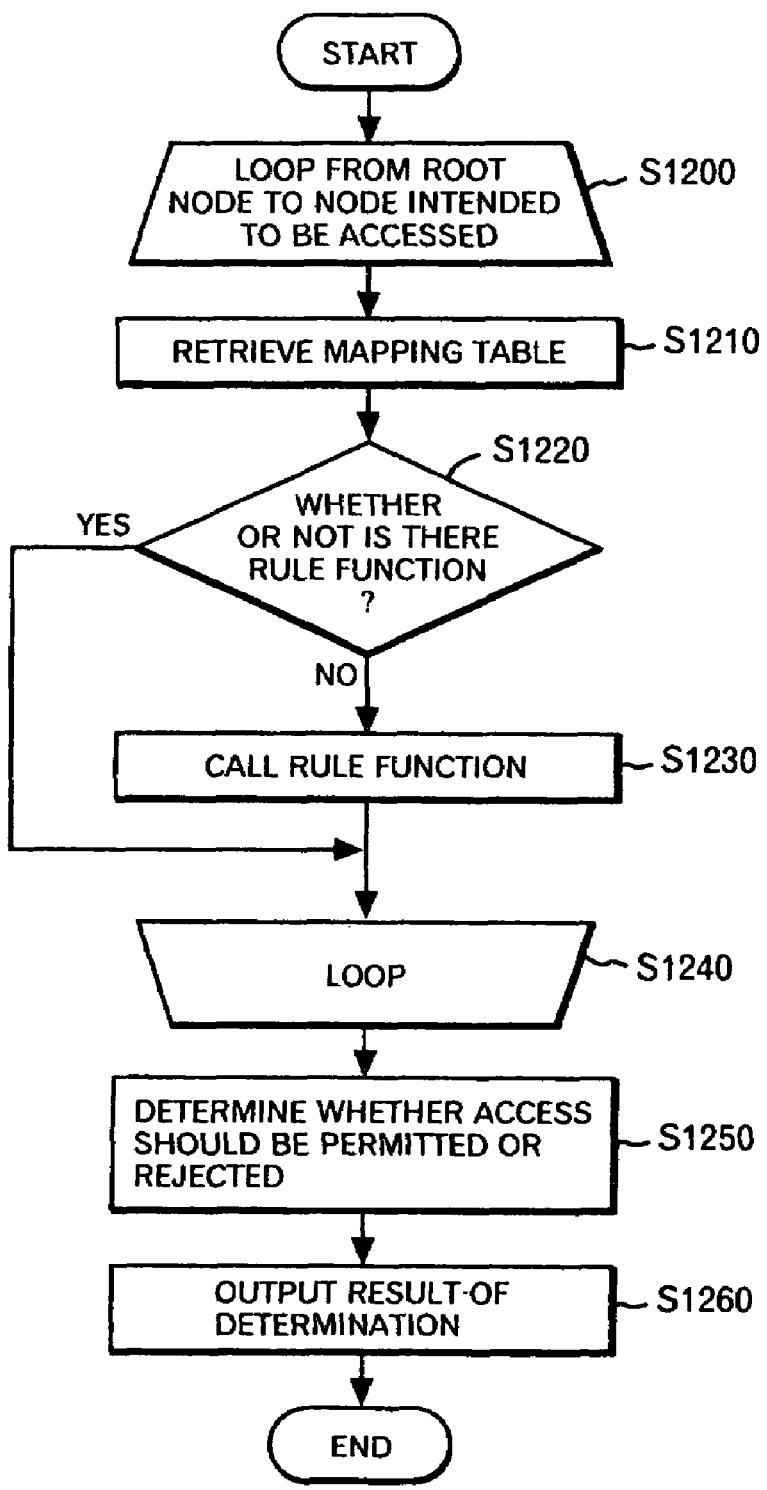
FIG. 12 shows a flow of determining whether an access should be permitted or rejected according to a modified example of an embodiment of the present invention.

FIG. 12 shows a flow of determining whether access should be permitted or rejected according to the first modified example of this embodiment. This flow of determining whether access should be permitted or rejected is used in lieu of step S935 of FIG. 9. The access management apparatus 100 sequentially calls rule functions which return their access control effects respectively for nodes, starting from the root node. On the basis of the access control effects which have been set up respectively for the nodes, the access management apparatus 100 determines whether the access to the object node should be permitted or rejected.

The selector 230 and the executor 235 perform processes of steps from S1210 through S1230 on each of the nodes from the root node through the object node (in steps S1200 and S1240). First of all, the selector 230 searches the mapping table 222, and thus selects a rule function associated with the node of the object node (in step S1210). In a case where the rule function has been stored in the mapping table 222 (in the case of a "Yes" determination in step S1220), the executor 235 calls the rule function, and obtains the access control effect which has been set up for the node proper to be processed (in step S1230).

After the aforementioned process is completed for each of the nodes from the root node through the object node of the access request, the executor 235 determines whether the access to the object node of the access request should be permitted or rejected, on the basis of the access control effects which have been obtained by means of calling each of the rule functions (in step S1250).

In this respect, the executor 235 rejects access to the object node in any one of the following cases:

(1) in a case where access rejection −R (the return value of the rule function is zero) has been set up for at least one of the ancestor nodes of the object node of the access request.

(2) in a case where, between the root node and the object node of the access request, there is a node for which no access control effect has been set up, and concurrently there is not a node for which access permission with propagation to the descendent nodes +R (the return value of the rule function is three) has been set up.

In addition, the executor 235 permits access to the object node in any one of the following cases:

(3) in a case where, among descendent nodes of every node for which no access control effect has been set up (the return value of the rule function is one), and which is present between the root node and the object node of the access request, there is not a node for which access rejection −R (the return value of the rule function is zero) has been set up, and concurrently there is a node for which access permission with propagation to the descendent node +R (the return value of the rule function is three) has been set up.

(4) in a case where access permission +R or +r has been set up for every node from the root node through the object node of the access request.

After the aforementioned process is completed, the executor 235 outputs, to the register 245 and the controller 240, a result of determining whether the access should be permitted or rejected (S1260).

The access management apparatus 100 according to this modified example can sequentially select rule functions associated respectively with positions of nodes from the root node through an object node, and accordingly can cause the executor 235 to sequentially execute rule functions which have been selected on the basis of entry of a requester of an access request. Subsequently, the controller 240 can control permission of, or rejection of, the access request on the basis of a result of determining whether the access should be permitted or rejected, the result having been obtained as a consequence of executing the rule function.

FIG. 13 shows an example of a mapping table 222 according to a second modified example of this embodiment. The configuration and operations of the access management apparatus 100 according to this modified example are similar to those of the access management apparatus 100 shown in FIG. 1. Hereinafter, descriptions will be omitted except for what makes the former access management apparatus different from the latter access management apparatus.

The mapping table 222 according to this modified example associates rule functions respectively with sets of a plurality of mutually different requesters and a plurality of mutually different positions, and stores the resultant rule functions. Each of the rule function determines whether access from each of the requesters to a node at each of the positions should be permitted or rejected. For example, the mapping table 222 shown in FIG. 13 associates a package name pkg1, an class name Cls1 and a method name method1 with a requester Hana and the position /a of an object node, and thus stores the package name pkg1, the class name Cls1 and the method name method1. The method is a rule function which returns an access control effect on the node at the position /a with regard to the requesters Taro and Hana.

The generator 215 performs a process which is a combination of generation of rule functions respectively for a plurality of mutually different requesters, as shown with reference to FIGS. 7 and 8, and generation of rule functions respectively for a plurality of mutually different node positions, shown with reference to FIGS. 10 to 12. Thereby, the generator 215 can generate rule functions respectively for the sets of the plurality of mutually different requesters and the plurality of mutually different node positions. In other words, for example, in step S730 of FIG. 7, the generator 215 extracts a plurality of rules 400 for a node position for which one or more requesters have been stored in the policy storage 210. Subsequently, in step S740, the generator 215 generates rule functions corresponding to the one or more requesters and positions. Each of the rule functions is that which performs a process similar to the process as shown in FIG. 11 on a corresponding requester.

Next, upon receipt of an access request, the selector 230 selects, from the function storage 220, a rule function associated with the requester of the access request and a position of the object node in step S905 of FIG. 9. Then, the executor 235 executes the rule function which has been selected by the selector 230. Subsequently, in steps S935 through S945 of FIG. 9, the controller 240 controls permission of, or rejection of, the access request on the basis of a result of determining whether the access should be permitted or rejected, the result having been obtained by a consequence of executing the rule function.

In this respect, in a case where the rule function is that which returns an access control effect of the node proper to be processed, the selector 230 and the executor 235 may determine whether access to an object node of an access request should be permitted or rejected, on the basis of the access control effect, as in the case shown in FIG. 12. The access control effect is obtained as a consequence of calling a rule function corresponding to the requester of the access request and the node position with regard to nodes from the root node through the object node.

In the case of this modified embodiment, the access management apparatus 100 can generate rule functions by means of dividing both a requester and a node position concerned. Accordingly, this makes it possible for the access management apparatus 100 to generate multiple rule functions in comparison to the case where rule functions are generated by means of dividing only a requester or only a node position. With regard to each of the multiple rule functions, the packaged rules are smaller in number, and the code size is smaller. As a consequence, the access management apparatus 100 can more efficiently process access requests by use of rule functions each with a smaller granularity. In addition, the generation of multiple rule functions each packaged with a smaller number of rules makes it possible to reduce overhead entailed by update of the rule functions in a case where parts of the rules in the policy storage 210 are updated.

In this respect, the generator 215 may generate rule functions in the following manner. First of all, the generator 215 may generate a rule function while associating the rule function with a requester or a node position. Under a condition that the size of the rule function exceeds a predetermined size due to division of the requester and the node size, the generator 215 may generate a rule function while associating the rule function with both the requester and the node position. Accordingly, this makes it possible for the access management apparatus 100 to divide a rule function which has become larger in size into two or more rule functions which are smaller in size on the basis of a requester or a node position concerning the rule function which has become larger in size.

Figure 14:
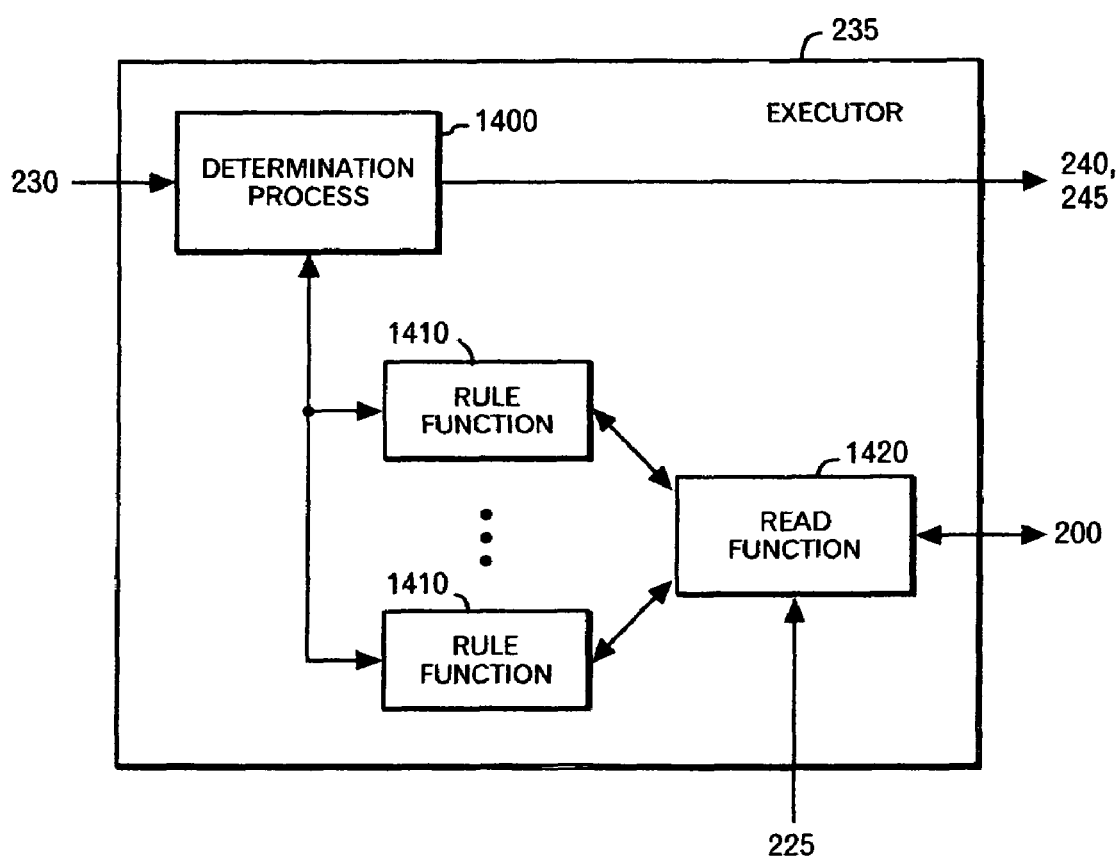
FIG. 14 shows a configuration of the executor according to an embodiment of the present invention.

FIG. 14 shows a configuration of the executor 235 according to a third modified example of this embodiment. The configuration and operations of the access management apparatus 100 according to this modified example are similar to those of the access management apparatus 100 according to the first modified example. Hereinafter, descriptions will be omitted except for what makes the access management apparatus according to this modified example different from the access management apparatus according to the first modified example.

Among rules 400 included in a policy 410, there may be a rule which specifies a predicate expression for at least one node from the root node through a node specified by the rule. Under a condition that a variable in a node specified takes on a predetermined value, the predicate expression directs setup of whether access to the node should be permitted or rejected for the node. In a case where the generator 215 according to the modified example is going to generate a rule function based on such a rule 400, the generator 215 packages the rule function with the following processes.

(1) The generator 215 packages, in the rule function, a process of calling a read function which has been generated beforehand, and causes the read function to acquire a value for the variable. This read function is provided to a plurality of rules 400 in common. The read function is that which receives a variable name that has been specified by the rules 400 as a parameter, and which calls a value on the variable on the basis of variable name.

(2) Under the following condition, the generator 215 packages, in the rule function, a process of returning information on whether access should be permitted or rejected, as a result of the determination. The determination of whether access should be permitted or rejected is specified by the rule. The condition is that a value of the variable which has been acquired by the read function is equal to a predetermined value.

The executor 235 according to this modified example executes one or more rule functions 1410 which have been generated in the aforementioned manner and a read function 1420 which may be used in common by two or more rule functions. On the basis of a result of the execution, it is determined, through a determination process 1400, whether access should be permitted or rejected.

More specifically, first of all, the receiver 225 supplies the read function with a node that is being referred to on the basis of an access request from a plurality of nodes constituting the hierarchical structured document. Accordingly, this makes it possible for the read function to identify which node Employee is being referred to, even in the case where, for example, a plurality of nodes, each with the same node name Employee, are present under the node department in FIG. 3.

Subsequently, the determination process 1400 in the executor 235 sequentially calls rule functions 1410 which have been selected by the selector 230 with regard to each of the nodes from the root node through a node specified by the access request. Then, while the executor 235 is processing each of the rule functions 1410 thus called, the executor 235 calls the read function 1420 by using a variable name, which has been specified in the rule 400, as a parameter. This variable name is that which specifies a node including a variable on the basis of a relative position which is obtained when the node being referred to is used as a reference.

Next, while the executor 235 is processing the read function 1420 which has been called by the rule function 1410, the executor 235 reads a value on the variable, which has been specified by the rule function 1410, from the data storage 200. Thus, the executor 235 returns the value to the rule function 1410. In this regard, the executor 235 selects a node at a relative position which is obtained when a node being referred to is used as a reference, and thus reads a value on the variable in the node at the relative position. The node at the relative position is included in a variable name which has been specified by the rule function. The node being referred to has been supplied from the receiver 225. Subsequently, the executor 235 returns to the process of the rule function 1410. The executor 235 determines whether or not the value on the variable which has been read by the read function 1420 agrees with a value specified by the rule 400. In a case where the value on the variable agrees with the specified value, the executor 235 returns the access control effect, which have been specified by the rule 400, to the determination process 1400.

FIGS. 15A and 15B respectively show examples of a rule function 1410 according to the third modified example of this embodiment. FIG. 15A shows an example of a rule function 1410 which is obtained in a case where a rule 400 is "<Taro,/a/b/c[@d=1],+r>." This rule function 1410 is called in step S1230 of FIG. 12, in a case where the position of a node to be processed is /a/b/c.

In its first line, the rule function 1410 receives a requester of an access request as a character string parameter sbj. In its second line, the rule function 1410 compares a constant 'Taro' of a character string marking a requester specified by the rule 400 with the requester sbj of the access request. In a case where the constant 'Taro' agrees with the requester sbj, the rule function 1410 performs processes in its third to sixth lines.

In its third and fourth lines, the rule function 1410 calls a read function dataRetrieve( ) by using a variable name '@d' as a parameter. The variable name '@d' has been specified by the rule 400. Then, the rule function 1410 assigns a value on the variable @d to a character string array value. The value on the variable @d is a return value of dataRetrieve( ). Subsequently, in its fifth line, the rule function 1410 converts the value value[0] on the variable @d to an integer value, and thus compares the value obtained by the conversion with a value 1 (one) which has been specified by the rule 400. Then, in a case where, as a result of the comparison in the fifth line, @d takes on 1 (one), the rule function 1410 returns a value 2 indicating an access control effect +r to the determination process 1400 in its sixth line.

FIG. 15b shows an example of a rule function 1410 which is obtained in a case where a rule 400 is "<Taro,/a/b [@e='level1']/c[@d=1],+r>." This rule function 1410 is called in step S1230 of FIG. 12, in a case where the position of a node to be processed is a/b/c.

In its first line, the rule function 1410 receives a requester of an access request as a character string parameter sbj. In its second line, the rule function 1410 compares the requester sbj of the access request with a constant 'Taro' of a character string marking a requester specified by the rule 400. In a case where the requester sbj agrees with the constant 'Taro', the rule function 1410 performs processes in its third to seventh lines.

In its third and fourth lines, the rule function 1410 calls a read function dataRetrieve( ) by using variable names '../@e' and '@d' as parameters. The variable names '../@e' and '@d' have been specified by the rule 400. Then, the rule function 1410 assigns values on the variables @e and @d to a character string array value. The values on the variables @e and @d are return values of dataRetrieve( ). In this respect, the variable name '../@e' specifies a node including the variable @e on the basis of a relative position which is obtained when a node /a/b/c being referred to is used as a reference. Specifically, since a parent node /a/b of the node /a/b/c being referred to is specified by the relative position '../', the variable @e in /a/b is read.

Subsequently, in its sixth line, the rule function 1410 compares the values on the variables @e and @d respectively with a value 'level1' and a value 1 (one). Then, in a case where, as a result of the determination in the sixth line, @e agrees with 'level1' and concurrently @d agrees with 1 (one), the rule function 1410 returns a value 2 indicating an access control effect +r to the determination process 1400 in its seventh line.

The access management apparatus 100 according to this modified example can efficiently determine whether access should be permitted or rejected by use of a rule function 1410, even in a case where a rule specifying a condition for a value on a variable by means of a predicate expression is included.

FIGS. 16A and 16B respectively shows other examples of the rule function according to this embodiment. In a case where a rule 400 specifies a node by use of a notation '//' marking a descendent node, the generator 215 expresses a character string, which marks a position of a node specified by the rule 400, with a regular expression whose pattern matches the pattern of a character string marking a position of a node intended to be accessed.

FIG. 16A shows an example of a rule function which the generator 215 generates on the basis of a rule <Taro,/a//d,–R>. In the first line, the character string a//d marking the position is replaced with the pattern pattern of the regular expression. More specifically, the position /a//d can be divided into the following two cases. One of the two cases is '/a/d' which puts a and d in a parent-child relationship. The other of the two cases is '/a/.*/d' which puts a and d in an ancestor-descendent relationship other than a parent-child relationship. In this respect, '.*' is a notation indicating a character string including one or more optional characters (its regular expression is '.'), and the pattern of this notation matches the pattern of the name of one node which is a descendent of a and an ancestor of d, or the patterns of the names of a plurality of nodes which are descendents of a and ancestors of d.

In addition, the pattern of the notation needs to match the patterns of the names of the descendent nodes of '/a/d' or '/a/.*/d'. This is because the access control effect of this rule is propagated to descendents –R. To this end, the generator 215 prepares a pattern which causes the character string of the node intended to be accessed to match '/a/d' and '/a/.*/d', or a pattern which causes the character string of the node intended to be accessed to match '/a/d/.*' and '/a/.*/d/.*' which indicate all of the descendent nodes of '/a/d' and '/a/.*/d'. Incidentally, in the case of this example, by use of the java.util.regex package which is one of the basic packages of Java (registered trademark), the pattern of the regular expression is compiled (in the first line), and the patterns are matched (in the fourth line).

In its second line, the rule function methodDesc receives a character string sbj marking the requester and a character string accessPath marking the position of the node intended to be accessed. Subsequently, in a case where the requester is Taro (in the third line) and concurrently the character string accessPath marking the position agrees with the pattern which has been beforehand prepared (in the fourth to the fifth lines), the rule function methodDesc returns access rejection corresponding to the access control effect –R specified by the rule.

FIG. 16B shows an example of a rule function generated in association with the requester Taro. The rule function shown in FIG. 16B is the same as the rule function shown in FIG. 16A, except that the rule function shown in FIG. 16B receives a character string marking the position of a node intended to be accessed and thus returns access rejection with regard to the requester Taro.

In addition, even in a case where a rule 400 includes '*' indicating its match with node names at one arbitrary level, the generator 215 can generate a rule function as in the case of '//'. Specifically, the generator 215 converts '*' in the rule to a regular expression [^/]* which is caused to match one or more characters which are arbitrary, and thus prepares the regular expression as a pattern "pattern" which has to be matched with the pattern of a node intended to be accessed.

At the aforementioned point, the generator 215 may combine rules including '//' or '*' into a single method function for each class, and thereby provide the single method function as a single rule function to each class. In this case, first of all, the executor 235 calls the rule function. In a case where access to the position of the node intended to be accessed is not rejected by the rule function, the executor 235 may determine whether access should be permitted or rejected by means of calling a rule function which does not include a process of '//' or a process '*'.

Use of rule functions as described above makes it possible to adequately process rules 400 even in a case where a person who sets up a policy 410 creates rules 400 understandably by use of '//' and '*'.

Figure 17:
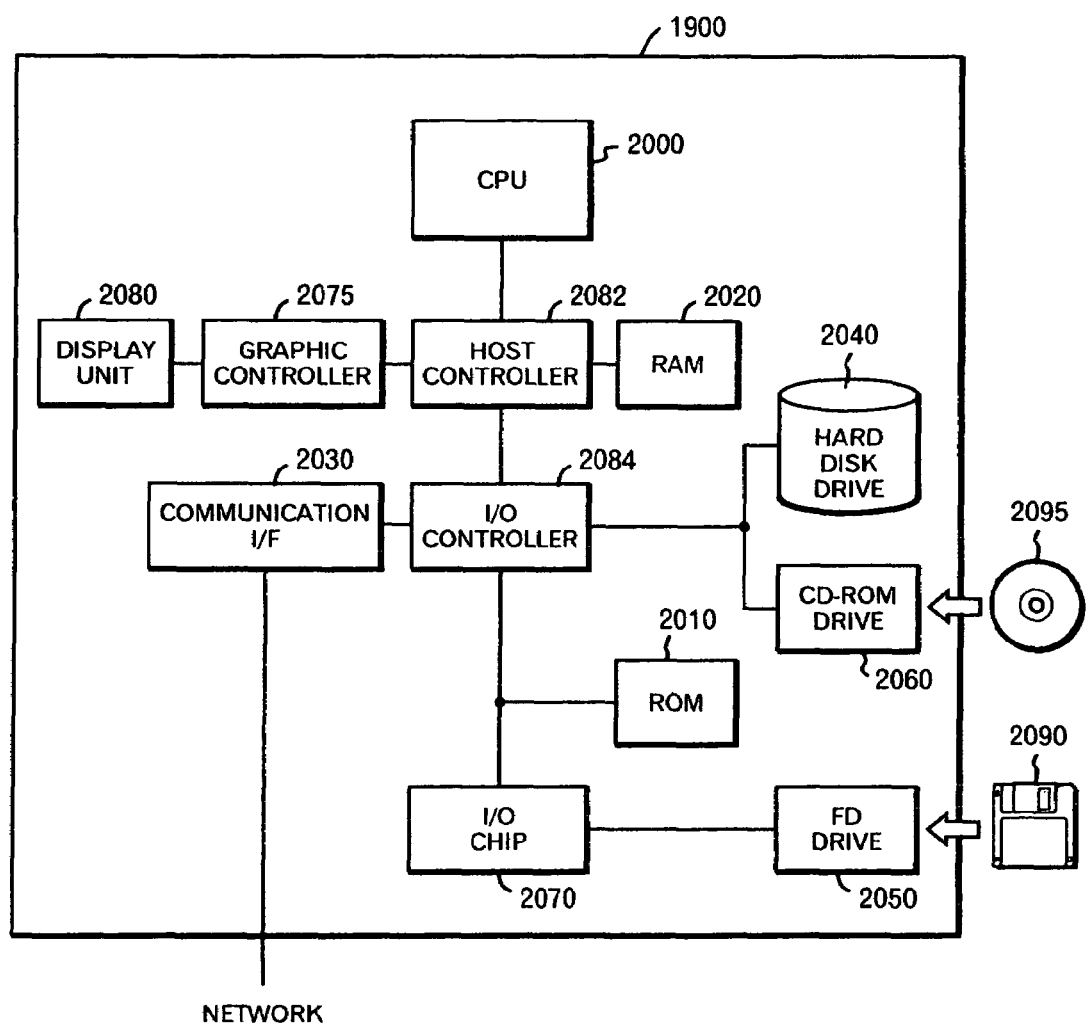
FIG. 17 shows an example of a configuration of a computer according to an embodiment of the present invention.

FIG. 17 shows an example of a configuration of a computer 1900 according to this embodiment. The computer 1900 according to this embodiment includes a CPU peripheral module, an input-output module and a legacy input-output module. The CPU peripheral module includes a CPU 2000, a RAM 2020, a graphic controller 2075 and a display unit 2080 which are connected with one another via a host controller 2082. The input-output module includes a communications interface 2030, a hard disc drive 2040 and a CD-ROM drive 2060 which are connected with the host controller 2082 via an input-output controller 2084. The legacy input-output module includes a ROM 2010, a flexible disc drive 2050 and an input-output chip 2070 which are connected to the input-output controller 2084.

The host controller 2082 connects the RAM 2020, the CPU 2000 and the graphic controller 2075 with one another. The CPU accesses the RAM 2020 at a high transmission rate. The CPU 2000 operates on the basis of programs stored in the ROM 2010 and the RAM 2020, and thus controls each of the units. The graphic controller 2075 acquires image data which the CPU 2000 and the like generate on a frame buffer provided in the RAM 2020, and thus causes the image data to be displayed on the display unit 2080. The graphic controller 2075 may include, in its inside, a frame buffer for storing image data generated by the CPU 2000 and the like.

The input-output controller 2084 connects the host controller 2082, the communications interface 2030, the hard disc drive 2040 and the CD-Rom drive 2060. The communications interface 2030 is a relatively high-speed input-output unit. The communications interface 2030 communicates with the other units via the network. The hard disc drive 2040 stores programs and data which are used by the CPU 2000 in the computer 1900. The CD-ROM drive 2060 reads programs or data from the CD-ROM 2095, and thus provides the programs or data to the hard disc drive 2040 via the RAM 2020.

In addition, relatively low-speed input-output units of the ROM 2010, the flexible disc drive 2050 and the input-output chip 2070 are connected to the input-output controller 2084. The ROM 2010 stores a boot program executed during the activation of the computer 1900, programs depending on the hardware of the computer 1900 and the like. The flexible disc drive 2050 reads programs or data from a flexible disc 2090, and thus provides the programs or data to the hard disc drive 2040 via the RAM 2020. The input-output chip 2070 connects various input-output units with one another via the flexible disc drive 2050, and, for example, a parallel port, a serial port, a keyboard port, a mouse port and the like.

The programs intended to be provided to the hard disc drive 2040 via the RAM 2020 are beforehand stored in a recording medium, such as the flexible disc 2090, the CD-ROM 2095 or an IC card, and thus are provided, in the stored form, by a user. The programs are read from the recoding medium, are installed into the hard disc drive 2040 in the computer 1900 via the RAM 2020, and are executed in the CPU 2000.

A program which is installed into the computer 1900, and which causes the computer 1900 to function as the access management apparatus 100 includes a data management module for managing the data storage 200; a policy management module for managing the policy storage 210; a generation module; a function management module for managing the function storage 220; a reception module; a selection module; an instance management module for managing the instance storage 232; an execution module; a control module; a registration module; a retrieval module; and a determination module. The program and the modules work on the CPU 2000 and the like, and thus cause the computer 1900 to function as the data storage 200, the policy storage 210, the generator 215, the function storage 220, the receiver 225, the selector 230, the instance storage 232, the executor 235, the controller 240, the register 245, the retriever 250 and the determiner 255.

The aforementioned program and modules may be stored in an external storage medium. The flexible disc 2090 and the CD-ROM 2095 can be used as the storage medium. In addition, optical recording media, magneto-optical recording media, tape media, semiconductor memories and the like can be used as the storage medium. Optical recording media may include DVDs and CDs. Magneto-optical media may include MOs. The semiconductor memories may include IC cards. As well, a storage unit, such as a hard disc or a RAM, may be provided to a server system connected to a dedicated communications network and the Internet, as the recording medium, and the program may accordingly be provided to the computer 1990 through the network.

The technical scope of the present invention is not limited to the scope as recited in the aforementioned embodiment, although the present invention has been described using the embodiment. It is obvious to those skilled in this art that various modifications and improvements can be added to the aforementioned embodiment. It is clearly understood from a description of the scope of claims that embodiments which are obtained by adding any of such various modifications and improvements to the aforementioned embodiment are also included in the technical scope of the present invention.

In the case of the present invention, access controlling rules are divided, and thus are implemented as rule functions. Accordingly, this makes it possible to control access efficiently.

Although the preferred embodiment of the present invention has been described in detail, it should be understood that various changes, substitutions and alternations can be made therein without departing from spirit and scope of the inventions as defined by the appended claims.

What is claimed is:

1. An access management method of causing a computer to permit or prohibit access to each of a plurality of data element objects stored in an internal or an external data storage, wherein the method comprises:

organizing within the computer the plurality of data element objects into a hierarchal tree structure wherein the data element objects are represented by a plurality of nodes where a node of an uppermost hierarchy is regarded as a root node;

representing a position of each of the nodes in the hierarchal structure by a character string wherein the character string includes a node name on a route from the root node to an object node and wherein the position is further represented by one or more constants;

storing one or more rule functions that determine whether access to the object node should be permitted or rejected depending on the position of the object node in the hierarchical structure, in association with each of a plurality of requesters, whose access to the object node is different from each other, the one or more rule functions further including access control effects controlling access to the object node and descendant object nodes associated with the object node;

generating one or more classes wherein the one or more rule functions are assembled together;

receiving an access request from a requester from the plurality of requesters;

selecting a rule function associated with the requester of the access request from the one or more rule functions;

executing the selected rule function, which has been selected by a selector, by calling the rule function one of the generated one or more classes using the position of the object node marked by one of the one or more constants by comparing the position of the object node to be accessed with the selected rule function;

determining if the requester of the access request is permitted access to the object node to be accessed and descendant object nodes associated with the object node to be accessed based on the access control effects associated with the requester of the access request; and controlling permission or prohibition of the access request in the computer based on the executing of the rule function.

2. An access management method of causing a computer to permit or prohibit access to each of a plurality of data element objects stored in an internal or an external data storage, wherein the method comprises:

organizing within the computer the plurality of data element objects into a hierarchal tree structure wherein the data element objects are represented by a plurality of nodes where a node of an uppermost hierarchy is regarded as a root node;

representing a position of each of the nodes in the hierarchal structure by a character string wherein the character string includes a node name of a route from the root node to an one or more object nodes;

storing one or more rule functions that determine whether access to the one or more object nodes should be permitted or rejected depending on the respective position of the one or more object nodes in the hierarchical structure in association with each of a plurality of requesters, whose access to the one or more object nodes are different from each other;

determining whether an access permission of one of the plurality of requesters is associated with a permission level granting or denying access to a requested one of the object nodes and wherein the permission level also grants or denies access to a descendant object node associated with said requested one of the object nodes;

mapping to a mapping table associations of the one or more rule functions to the requester of the plurality of requesters;

mapping to the mapping table a node position of the respective one or more object nodes wherein the node position is associated to the requester from the plurality of requesters;

receiving an access request to the requested one of the object nodes from the requester of the plurality of requesters;

selecting the rule function associated with the requester of the plurality of requesters by referring to the mapping table;

executing the rule function, which has been selected by a selector, by calling the rule function of a class using the position of the requested one of the object nodes and the node position associated with the requester in the mapping table; and controlling permission or prohibition of the access request in the computer based on the executing of the rule function by returning an access control effect of a node position matching the requester and the determined access permission.

* * * * *